US008477804B2

(12) United States Patent
Yoshimoto et al.

(10) Patent No.: US 8,477,804 B2
(45) Date of Patent: Jul. 2, 2013

(54) ICMP TRANSLATOR

(75) Inventors: Tetsuro Yoshimoto, Kokubunji (JP); Masaki Nara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 229 days.

(21) Appl. No.: 11/899,000

(22) Filed: Sep. 18, 2007

(65) Prior Publication Data

US 2008/0212609 A1    Sep. 4, 2008

(30) Foreign Application Priority Data

Mar. 2, 2007    (JP) ................................. 2007-052168
Jul. 11, 2007    (JP) ................................. 2007-181609

(51) Int. Cl.
*H04J 3/22* (2006.01)

(52) U.S. Cl.
USPC ........................................................ 370/466

(58) Field of Classification Search
USPC ................. 370/351, 389, 392, 469, 229, 230, 370/231, 235, 236, 466
See application file for complete search history.

(56) References Cited

U.S. PATENT DOCUMENTS

| | | | | |
|---|---|---|---|---|
| 6,708,219 | B1* | 3/2004 | Borella et al. | 709/245 |
| 6,816,455 | B2* | 11/2004 | Goldberg et al. | 370/230 |
| 2002/0003775 | A1* | 1/2002 | Nakano et al. | 370/218 |
| 2002/0141448 | A1* | 10/2002 | Matsunaga | 370/469 |
| 2003/0131079 | A1* | 7/2003 | Neale et al. | 709/220 |
| 2004/0215976 | A1* | 10/2004 | Jain | 713/201 |
| 2006/0165051 | A1* | 7/2006 | Banerjee et al. | 370/351 |
| 2008/0080519 | A1* | 4/2008 | Park et al. | 370/395.54 |

FOREIGN PATENT DOCUMENTS

| | | |
|---|---|---|
| JP | H11-004259 A | 1/1999 |
| WO | 2006098670 A1 | 9/2006 |

OTHER PUBLICATIONS

F. Gont et al., "TCP's Reaction to Soft Errors", TCP Maintenance and Minor Extensions (tcpm), Internet-Draft, Aug. 2006, pp. 1-14.
R. Braden, Editor, "Requirements for Internet Hosts—Communication Layers", Network Working Group, Internet Engineering Task Force, Oct. 1989, pp. 1-116.
Office Action for application No. JP2007-181609, mailed on Oct. 11, 2011 w/ English translation.
F. Gont, TCP's Reaction to Soft Errors, Internet Draft draft-ietf-tcpm-tcp-soft-errors-03.txt.

* cited by examiner

*Primary Examiner* — Michael Thier
*Assistant Examiner* — Feben M Haile
(74) *Attorney, Agent, or Firm* — Hitachi America, Ltd.

(57) ABSTRACT

When an IPv4/v6 dual stack terminal communicating via TCP on IPv6 fails to promptly switch over to IPv4 after the ICMPv6 fails due to a soft error, the problem should be resolved at the prior stage server rather than on the complicated terminal. The server at a stage prior to the terminal receives TCP packets from the terminal to find the TCP connection status on the terminal. When the terminal connection status is SYN-SENT or SYN-RECEIVED, and the server receives an unaddressed soft error such as ICMPv6 "Destination Unreachable: no route to destination (ICMP type=1: code 0)" for that terminal, the server rewrites the ICMPv6 contents as a hard error such as "Destination Unreachable: communication with destination administratively prohibited (ICMP type=1: code 1)" and sends it the terminal.

11 Claims, 17 Drawing Sheets

| SOURCE IP ADDRESS | DESTINATION IP ADDRESS | SOURCE PORT | DESTINATION PORT | STATUS |
|---|---|---|---|---|
| 2000::1 | 2001::34 | 1025 | 35563 | SYN_SENT |
| 2000::3 | 2002::45 | 2034 | 44734 | ESTABLISHED |
| : | : | : | : | : |

1023

| SOURCE IP ADDRESS | DESTINATION IP ADDRESS | SOURCE PORT | DESTINATION PORT | STATUS | RETRY COUNTER |
|---|---|---|---|---|---|
| 2000::1 | 2001::34 | 1025 | 35563 | SYN_SENT | 1 |
| 2000::3 | 2002::45 | 2034 | 44734 | ESTABLISHED | 0 |
| ⋮ | ⋮ | ⋮ | ⋮ | ⋮ | |

| SOURCE IP ADDRESS | REWRITE ICMPv6 |
|---|---|
| ADDRESS FOR 2a | APPLY |
| ADDRESS FOR 2b | DON'T APPLY |
| : | : |

ICMP TRANSLATOR

CLAIM OF PRIORITY

The present application claims priority from Japanese applications JP 2007-052168 filed on Mar. 2, 2007 and JP 2007-181609 filed on Jul. 11, 2007, the contents of which are hereby incorporated by reference into this application.

FIELD OF THE INVENTION

This invention relates to an ICMP translator.

BACKGROUND OF THE INVENTION

According to TCP specifications described in RFC1122 (reference 1), a portion of ICMPv6 errors such as "Destination Unreachable: no route to destination (ICMP type-1: code 0)" might be "soft errors" such as temporary errors. Since the error is a "soft" or temporary error, the TCP connection is not immediately aborted even if this notification is received and attempts to establish a connection are repeated until the retry count is exceeded. Therefore no TCP connection on IPv4 is established even when a host operating on IPv4/v6 dual stack confirms that another host cannot be reached by communication on IPv6 due to an ICMPv6 error "Destination Unreachable: no route to destination". Instead, repeated attempts are made to establish a TCP connection on IPv6 up to the upper time out limit, causing the problem that constant delays occur as described in Section 3.2 in the draft-ietf-tcpm-tcp-soft-errors-01.txt (reference 2).

A technique to resolve this problem is disclosed in Section 4 of the draft-ietf-tcpm-tcp-soft-errors-01.txt (reference 2) by changing the TCP in the terminal to promptly quit the connection if a soft error is received just in the phase where establishing the connection.

Reference 1: Braden, R., "Requirements for Internet Hosts—Communication Layers", STD-3, RFC 1122, October 1989.

Reference 2: F. Gont., "TCP's Reaction to Soft Errors", Internet-Draft, draft-ietf-tcpm-tcp-soft-errors-01.txt. August 2006.

SUMMARY OF THE INVENTION

However, in terminals where proprietary software such as Windows is virtually indispensable, there are many cases where the above described technique for modifying the terminal software is impossible to use. There is therefore needed a method that resolves the problem in the external server at a stage prior to the terminal.

In this method, a server at a stage prior to the terminal intercepts a TCP packet from a terminal to find the terminal's TCP connection status. When the terminal TCP connection status is SYN-SENT or SYN-RECEIVED, the server receives a soft error, such as ICMPv6 "Destination Unreachable: no route to destination (ICMP type 1: code 0)" addressed to the applicable terminal. The server then rewrites the ICMPv6 contents as a separate hard error such as "Destination Unreachable: communication with destination administratively prohibited (ICMP type=1: code 1)" and sends it the terminal. The terminal is in this way made to promptly quit establishing a TCP connection via IPv6, and shifts to establishing a TCP connection by way of IPv4 so that no connection delays occur.

A new server can be installed to implement this method but since the firewall (FW) recognizes the normal TCP connection status, this modification for ICMPv6 translation may be added in the FW.

This invention eliminates the need to make complicated adjustments to the terminal software, and avoids delays in making TCP connections when using IPv4/IPv6 dual stacks.

BRIEF DESCRIPTION OF THE DRAWINGS

FIG. 23 is a drawing showing an example of the terminal DB.

DETAILED DESCRIPTION OF THE PREFERRED EMBODIMENTS

First Embodiment

Figure 2:
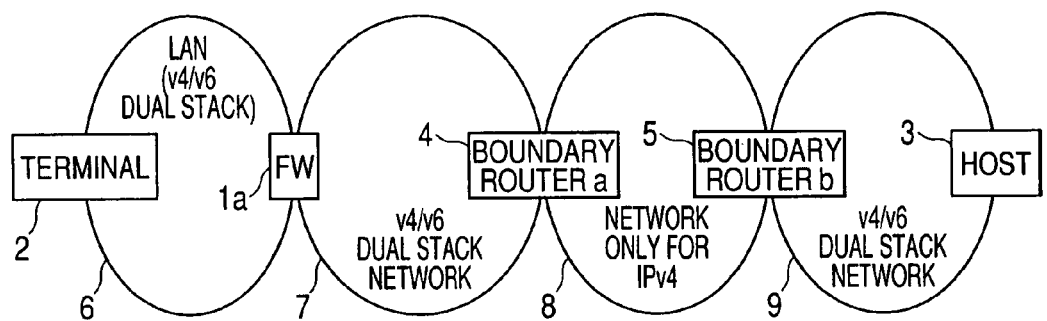
FIG. 2 is a drawing showing an example of a network where an IPv6 connection between the terminal 2 and the host 3 is impossible.

FIG. 2 is a drawing showing an example of a typical network structure for applying this invention. This network structure includes an IPv4/v6 dual stack LAN 6, a network 7, a network 9, and a network 8 that connects only with the IPv4. The LAN 6 and the network 7 are connected with the server of this invention by way of the FW 1a. The network 7 and the network 8 are connected by way of a boundary router a4. The network 8 and the network 9 are connected by way of a boundary router b5. The terminal 2 is IPv4/v6 dual stack compatible. The terminal 2 first of all attempts to communicate via IPv6. If communication by way of IPv6 fails, then the terminal 2 includes a fallback function to attempt communication by switching to IPv4. During communication from the terminal 2 to the host 3, the network 8 can be selected as a communication path so communication via IPv6 is impossible between the terminal 2 and host 3. A connection can be made by way of IPv4 but terminal 2 cannot know this beforehand.

Figure 3:
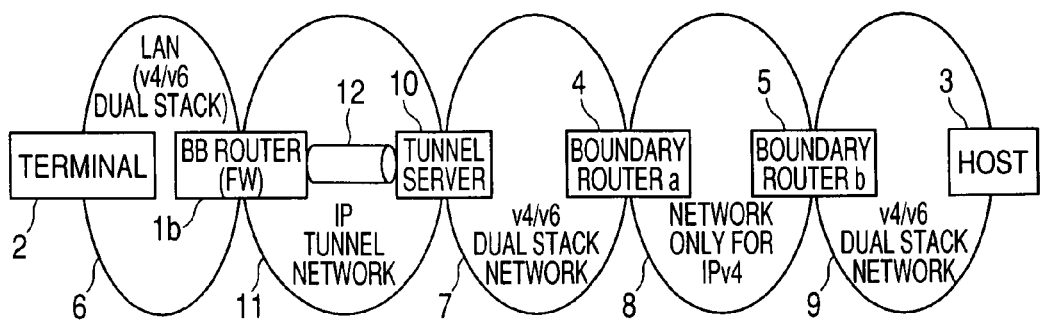
FIG. 3 is a drawing showing an example of a network where an IPv6 connection between the terminal 2 and the host 3 is impossible.

FIG. 3 is a drawing showing another example of a typical network structure for applying this invention. Here there is another network 11 between the LAN 6 and network 7. The LAN 6 and the network 7 are connected by way of a tunnel 12 set between the tunnel server 10 and the BB router 1b with FW function as the server of this invention.

Figure 4:
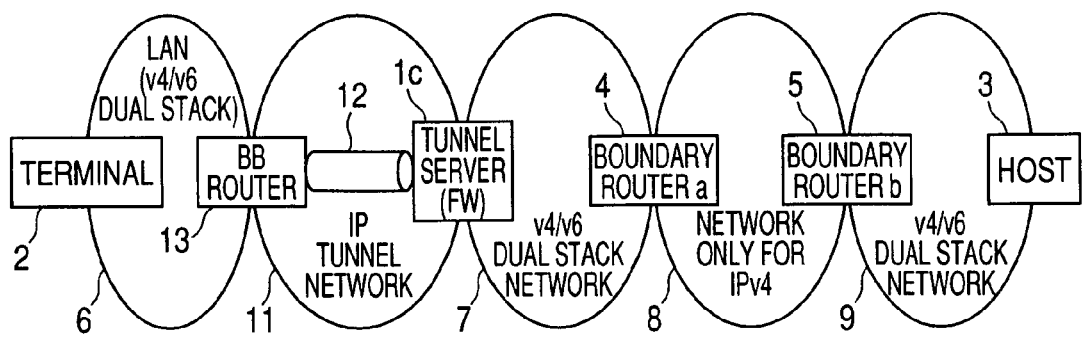
FIG. 4 is a drawing showing an example of a network where an IPv6 connection between the terminal 2 and the host 3 is impossible.

FIG. 4 is a drawing showing yet another example of a typical network structure for applying this invention. In this example, the LAN 6 and the network 7 are connected by way of the tunnel 12 set between the BB router 13 and the tunnel server 1c with FW function that is the server of this invention.

Figure 1:
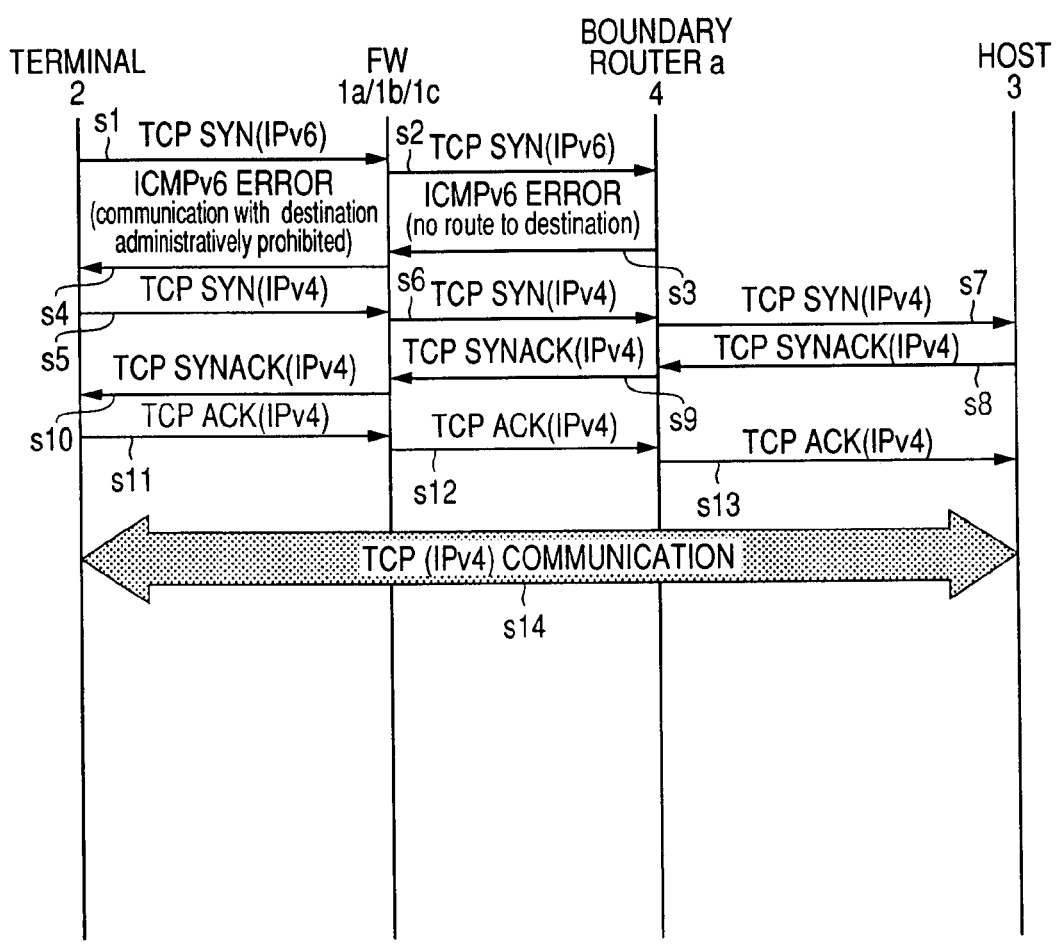
FIG. 1 is a sequence diagram of this invention where an FW has been installed in pre-stage of the terminal and shows the case where an IPv6 connection between the terminal 2 and the host 3 is impossible.

FIG. 1 is a sequence chart of this invention showing the case when establishing a TCP connection from terminal 2 towards the host 3. The TCP SYN (s1) for IPv6 sent from the terminal 2, reaches the boundary router a4 by way of the FW (firewalls) 1a/1b/1c. The boundary router a cannot make an IPv6 connection to the network 8 so an ICMPv6 error "Destination Unreachable: no route to destination (ICMP type=1: code 0)" is sent back to the transmitting source (s3). The FW receives that error message, checks the TCP connection status, and when confirmed as the SYN_SENT or SYN_RECEIVED status, changes the ICMPv6 "Destination Unreachable: no route to destination", rewriting it to another ICMPv6 error which is a separate hard error such as, "Destination Unreachable: communication with destination administratively prohibited (ICMP type=1: code 1), and transfers it to the terminal (s4). The soft error might also be rewritten to "Destination Unreachable: port unreachable (ICMP type=1, code=4). The terminal that received the s4 promptly switches the TCP connection to IPv4 and continues the sequence (s5 to s13) without repeating any timeouts or retries (via IPv6). A connection is therefore obtained via IPv4 between the host 3 and the terminal 2 so communication proceeds between terminal 2 and the host 3 via the TCP connection on IPv4 (s14).

The ICMPv6 error "Destination Unreachable: address unreachable (ICMP type=1: code 3) is also a soft error and so the same as for "Destination Unreachable: no route to destination", may be rewritten to "Destination Unreachable: communication with destination administratively prohibited", etc.

Figure 5:
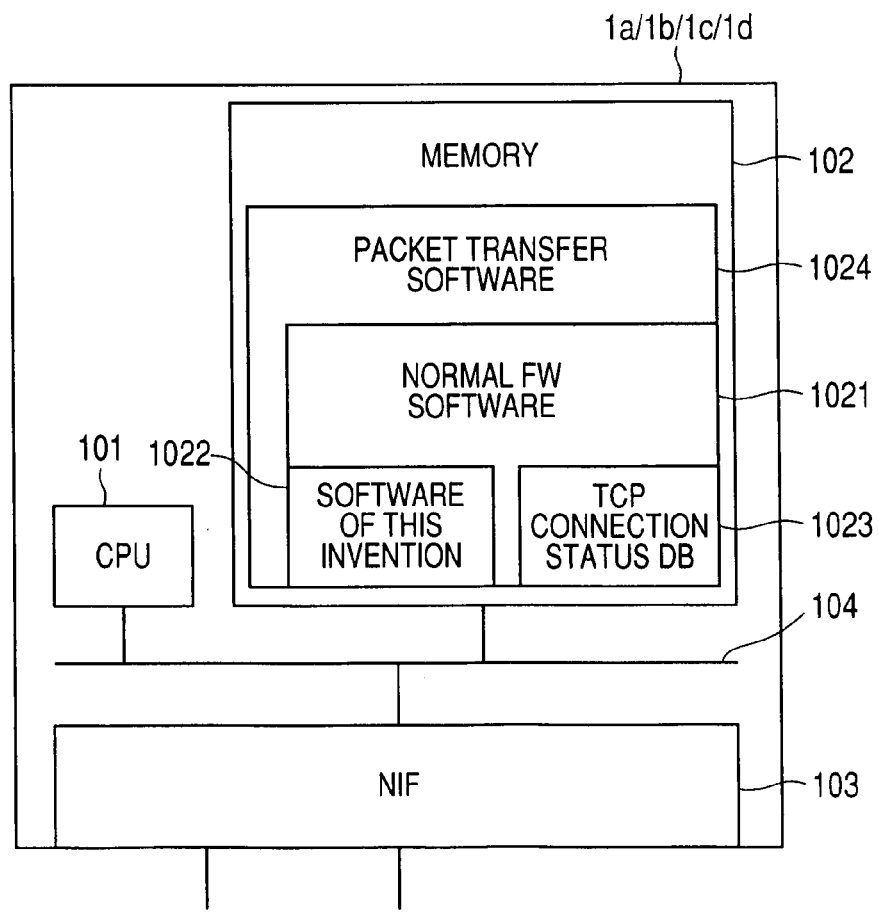
FIG. 5 is a structural view of the FW devices functioning as the server for this invention.

FIG. 5 is a structural view of the FW devices 1a/1b/1c functioning as the server for this invention. The server is a typical router system including a CPU 101 and memory 102 and NIF 103 connected by a bus 104. The memory includes packet transfer software 1024. The normal software 1021 with FW function is a portion of the packet transfer software. A portion of this normal software 1021, is the software 1022 and the TCP connection status DB 1023 of this invention.

Figure 6:
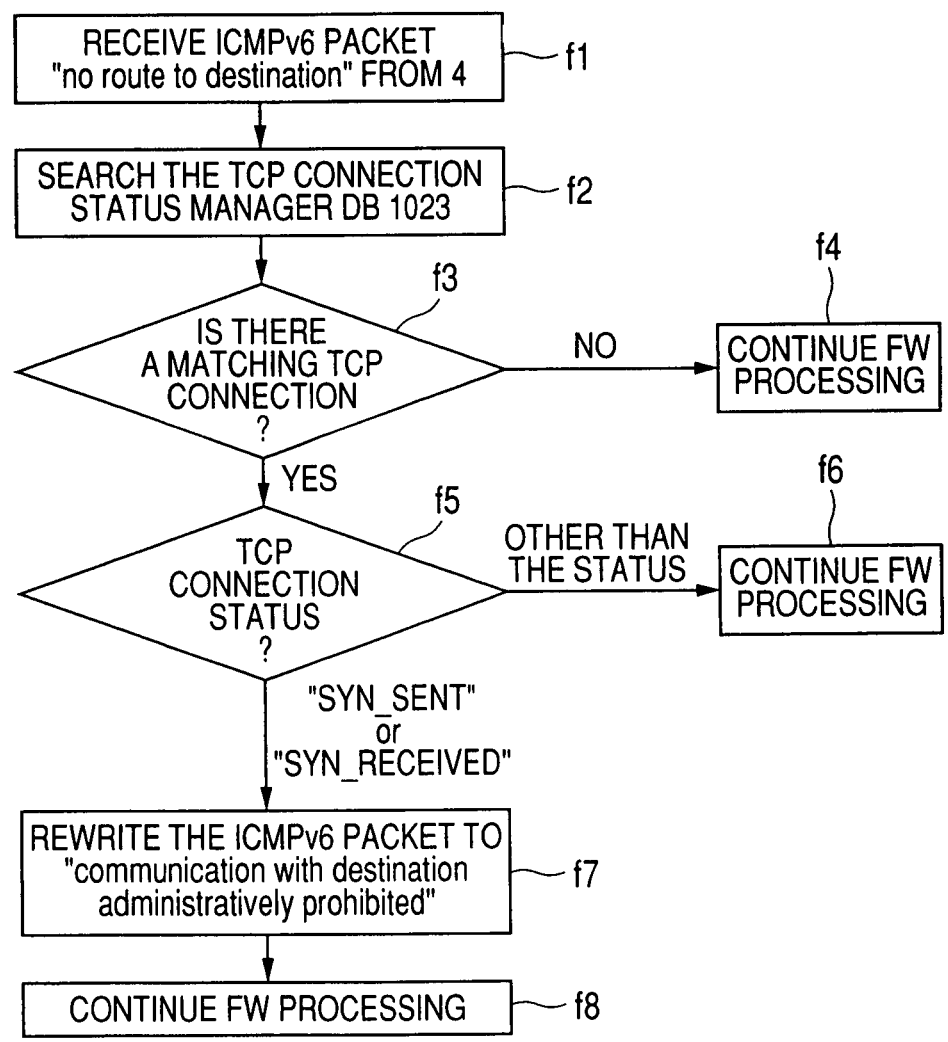
FIG. 6 is a flow chart for the software of this invention.

FIG. 6 is a flow chart for the software 1022 of this invention. This process is inserted as a pre-stage or as an intermediate stage of the normal software with FW function 1022. When the firewall FW devices 1a/1b/1c receive the ICMPv6 error "Destination Unreachable: no route to destination (ICMP type=1: code 0)" (f1); the software 1022 of this invention searches the TCP connection status DB 1023 (f2); and decides if there is a TCP connection matching the applicable ICMPv6 error (f3). If there is no matching TCP connection, then the firewall FW processing continues (f4). If there is a matching TCP connection, then the TCP connection status is next checked (f5). If the connection status is not "SYN_SENT" or "SYN_RECEIVED", then the firewall FW processing continues (f6). However if the connection status is "SYN_SENT" or "SYN_RECEIVED", then the received ICMPv6 packet is rewritten to a separate hard error such as the ICMPv6 error "Destination Unreachable: communication with destination administratively prohibited" (ICMP type=1, code=1)" (f7); and the FW processing continues (f8). This process renders the effect that the ICMPv6 error rewritten by the terminal 2 reaches the destination in cases where the ICMPv6 packet is not rejected by the normal FW software 1021, and the shift to an IPv4 connection can be made without waiting for a timeout.

Figures 7, 8:
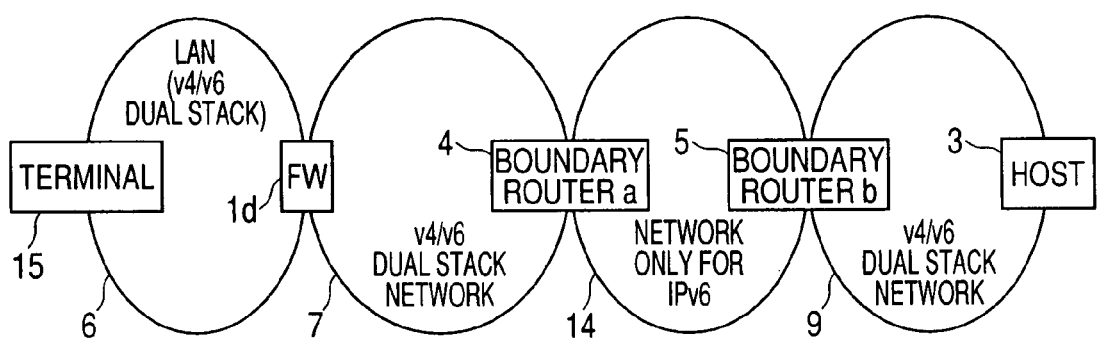
FIG. 7 is a drawing showing an example of the TCP connection status database.
FIG. 8 is a drawing showing an example of a network not capable of making IPv4 connections between the terminal 15 and the host 3.

FIG. 7 is a drawing showing an example of the TCP connection status DB 1024. The DB 1024 holds the addresses for the source and destination as well as the status of each port. The connection status of each packet is checked in this way.

The above embodiment therefore avoids TCP connection delays for destinations unreachable by IPv6 when utilizing IPv4/IPv6 dual stacks, and without changing the software on terminals with IPv6→IPv4 fallback functions.

Second Embodiment

The first embodiment dealt with the problem no IPv6 connection is possible between the terminal and host in circumstances where a terminal possessing the IPv6→IPv4 fallback function is attempting TCP communication. However, a situation may also occur where an IPv4 connection is impossible between the terminal and host in situations where a terminal possessing an IPv4→IPv6 fallback function is attempting TCP communication. However, even that situation can be resolved by applying this invention.

FIG. 8 is a drawing showing a typical network structure for applying this invention in the above situation. This network structure includes an IPv4/v6 dual stack LAN 6, network 7, network 9, and a network 14 that is only capable of IPv6 connections. The LAN 6 and the network 7 are connected by way of the FW 1d which is the server of this invention. The network 7 and the network 14 are connected by way of the boundary router a4. The network 14 and the network 9 are connected by way of the boundary router b5. The terminal 15 possesses IPv4/v6 dual stack capability and first of all attempts communication on IPv4. The terminal 15 includes a fallback function to switch to IPv6 and attempt communication if IPv4 communication has failed. The network 14 must be selected as the communication path during communication from the terminal 15 to the host 3 which makes communication on IPv4 between the terminal 15 and host 3 impossible. Only an IPv6 connection is possible but the terminal 15 cannot know this beforehand.

Figure 9:
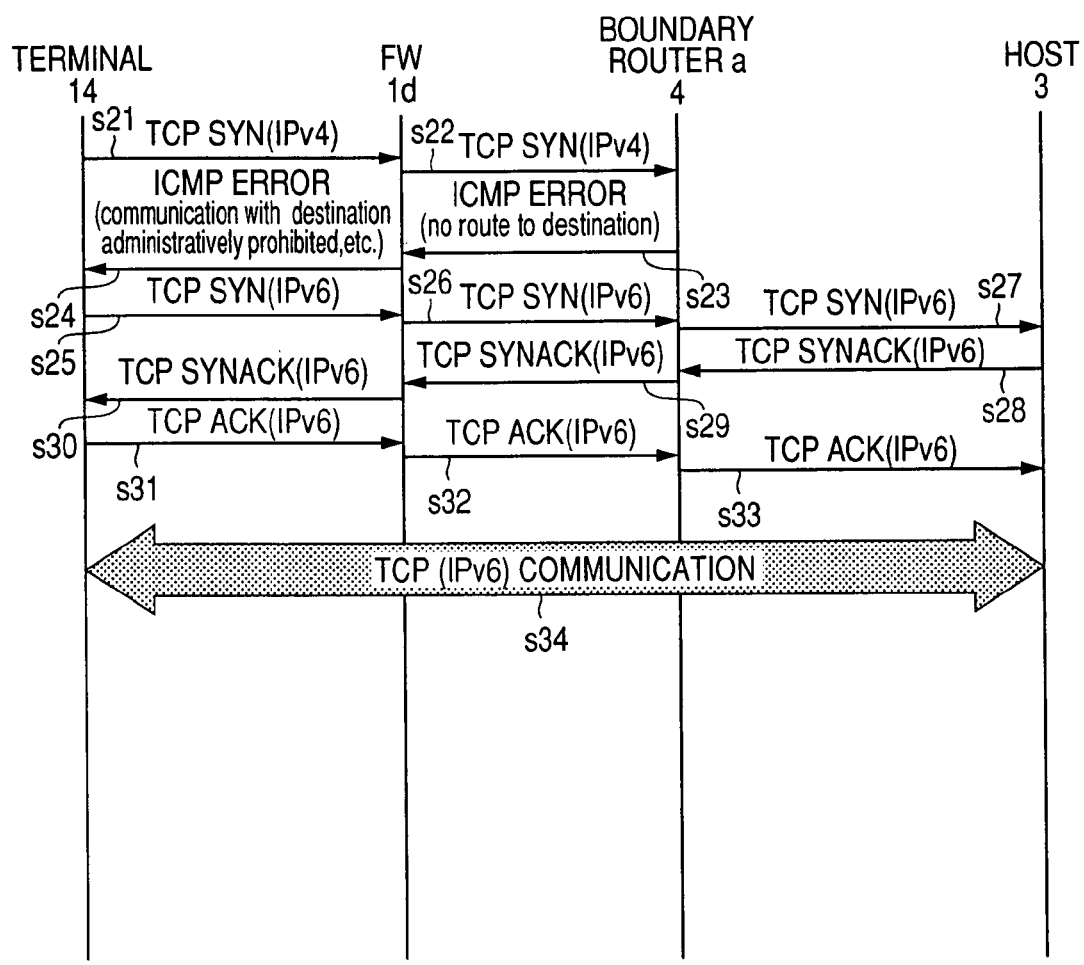
FIG. 9 is a sequence diagram of this invention where a FW was installed in a pre-stage of the terminal, IPv4 connection cannot be made between the terminal 15 and the host 3.

FIG. 9 is a sequence diagram for this invention showing the case when establishing a TCP connection from the terminal 15 to the host 3. The terminal 14 sends a TCP SYN (s21) via IPv4 that reaches the boundary router a4 via FW 1*d* (s22). The boundary router a does not have IPv4 connection capability with the network 14 so the ICMPv4error "Destination Unreachable: network unreachable (ICMP type=3: code 0)" or "Destination Unreachable: host unreachable (ICMP type=3: code 1)" is returned to the transmission source (s23). When the FW that received that ICMPv4 error message, checks the TCP connection status and confirms the SYN_SENT or SYN_RECEIVED status, it rewrites the ICMPv4 error as a separate hard error such as the ICMPv4 error "Destination Unreachable: destination network administratively prohibited (ICMP type=3: code 9)" and sends it to the terminal (s24). All other error messages are potential rewrite candidates except for those whose ICMP type=1 and code is other than 0, 1, 5. The terminal that received s24 then promptly shifts over to TCP connection via IPv6 and continues the sequence with no repeated timeouts or retries (s25 to s33). The connection between the terminal 15 and the host 3 on IPv6 is therefore established with no particular failures, and communication performed between the terminal 15 and host 3 by way of the TCP connection on IPv6 (s34).

The ICMPv6 error ""Destination Unreachable: address unreachable (ICMP type=1: code 5) is also a soft error and can therefore also be rewritten, the same as "Destination Unreachable: network unreachable" or "Destination Unreachable: host unreachable", to "Destination Unreachable: destination network administratively prohibited" etc.

The above embodiment therefore avoids TCP connection delays for destinations unreachable by IPv4 when utilizing IPv4/IPv6 dual stacks, and without changing the software on terminals with IPv4→IPv6 fallback functions.

Third Embodiment

In the first embodiment, another FW was physically installed in a pre-stage of the terminal. However this invention can also be applied to cases where the FW function is installed as software in a stage prior to the terminal's packet transfer software.

Figure 10:
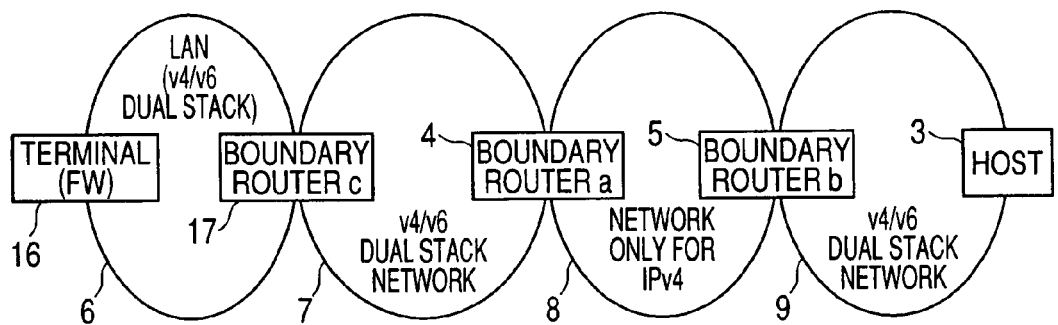
FIG. 10 shows an example of a network not capable of making IPv6 connections between the terminal 16 and the host 3.

FIG. 10 is a drawing showing a typical network structure for applying this invention. This network structure includes an IPv4/v6 dual stack LAN 6, network 7, network 9, and a network 8 only capable of IPv4 connections. The LAN 6 and network 7 are connected by a boundary router c17, the network 7 and network 8 are connected a boundary router a4, and the network 8 and network 9 are connected by a boundary router b5. The terminal 16 possesses IPv4/v6 dual stack capability and first of all attempts communication on IPv6. The terminal 16 includes a fallback function to switch to IPv4 and attempt communication if IPv6 communication fails, and further includes software with an FW function containing the software functions of this invention. The network 8 must be selected as the communication path during communication from the terminal 16 to the host 3 so that IPv6 communication is impossible between the terminal 16 and host 3. Only an IPv4 connection is possible (because network 8 is IPv4 only) but the terminal 16 cannot know this beforehand.

Figure 12:
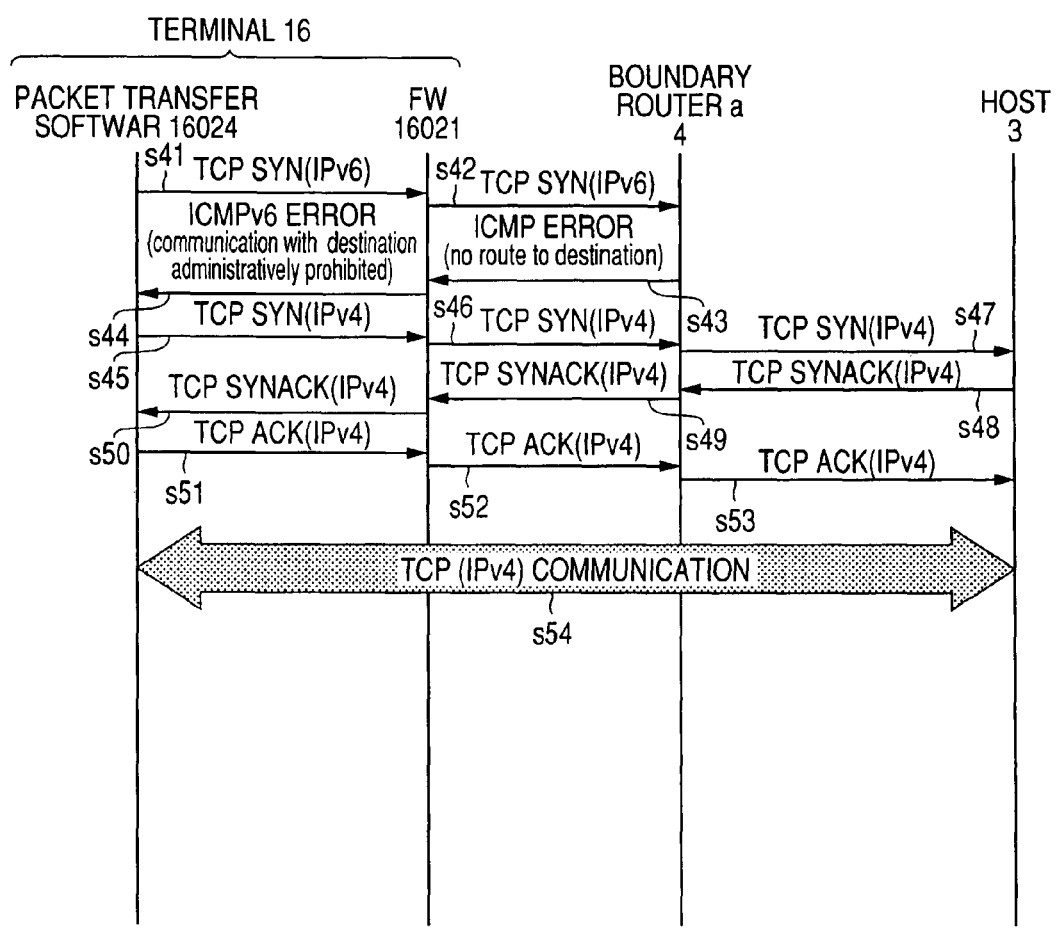
FIG. 12 is a sequence drawing of this invention when the terminal 16 contains the software of this invention in the case where an IPv6 connection is impossible between the terminal 16 and the host 3.

FIG. 12 is a sequence diagram for this invention showing the case when establishing a TCP connection from the terminal 16 to the host 3. The packet transfer software 16024 on terminal 16 sends a TCP SYN (s41) on IPv6 that reaches the boundary router a4 by way of the FW function software 16021 on the terminal 16 (s42). The boundary router a does not have IPv6 connection capability with the network 8 so an ICMPv6 error "Destination Unreachable: no route to destination (ICMP type=1: code 0)" is returned to the transmission source (s43). When the FW function software on terminal 16 which received that ICMPv6 error message, checks the TCP connection status and confirms the SYN_SENT or SYN_RECEIVED status, it rewrites the ICMPv6 error "Destination Unreachable: no route to destination" as a separate hard error such as the ICMPv6 error "Destination Unreachable: communication with destination administratively prohibited (ICMP type=1: code 1)" and sends it to the packet transfer software 16024 on terminal 16 (s44). This soft error can also be rewritten as, "Destination Unreachable: port unreachable (ICMP type=1, code=4). The terminal that received s44 can promptly shift the TCP connection to IPv4 and continue the sequence without repetitive timeouts or retries (s45 to s53). The connection between the terminal 16 and the host 3 on IPv4 is therefore established with no particular failures, and communication performed by way of the TCP connection on IPv4 between the terminal 16 and host 3 (s54).

The ICMPv6 error ""Destination Unreachable: address unreachable (ICMP type=1: code 3) is also a soft error and can therefore also be rewritten, the same as "Destination Unreachable: no route to destination" to "Destination Unreachable: communication with destination administratively prohibited" etc.

Figure 11:
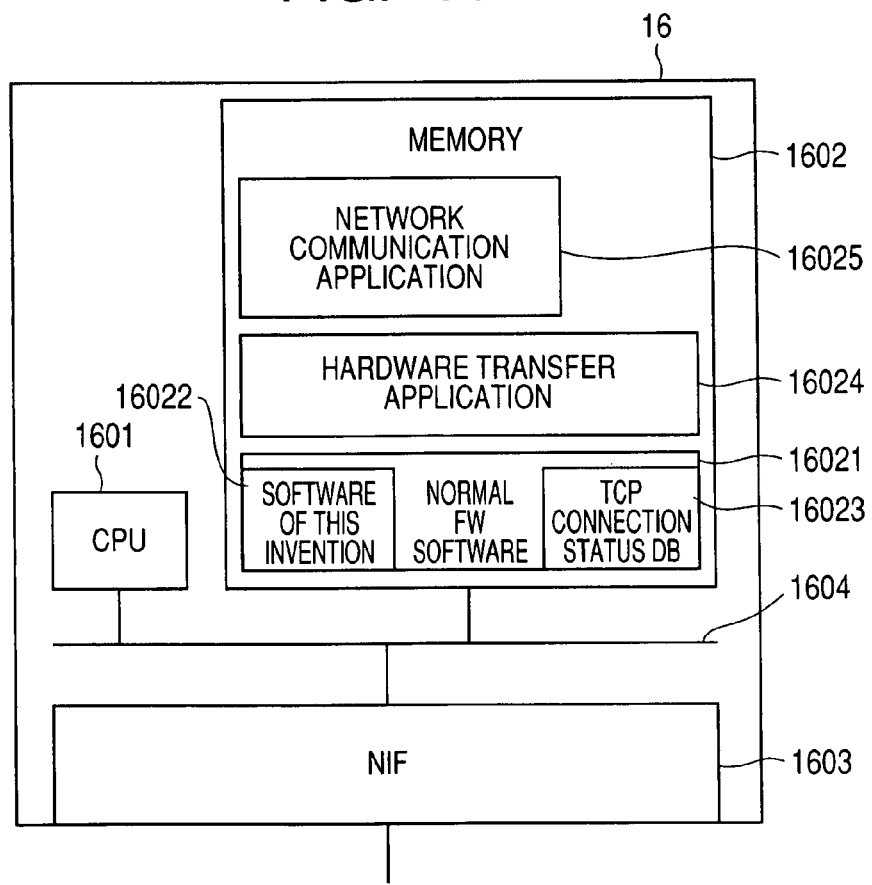
FIG. 11 is a block diagram showing the terminal 16 installed with the software of this invention.

FIG. 11 is a block diagram showing the structure of the terminal 16 applied to this invention. The terminal is a typical network terminal system including a CPU 1601 and memory 1602 and NIF 1603 connected by a bus 1604. The memory includes the packet transfer software 16024, a network communication application 16025 utilizing that software, and the normal software 16021 with FW function. A portion of the normal software 16021 with FW function is made up of the modified software of this invention, and the TCP connection status DB 16023.

Figure 13:
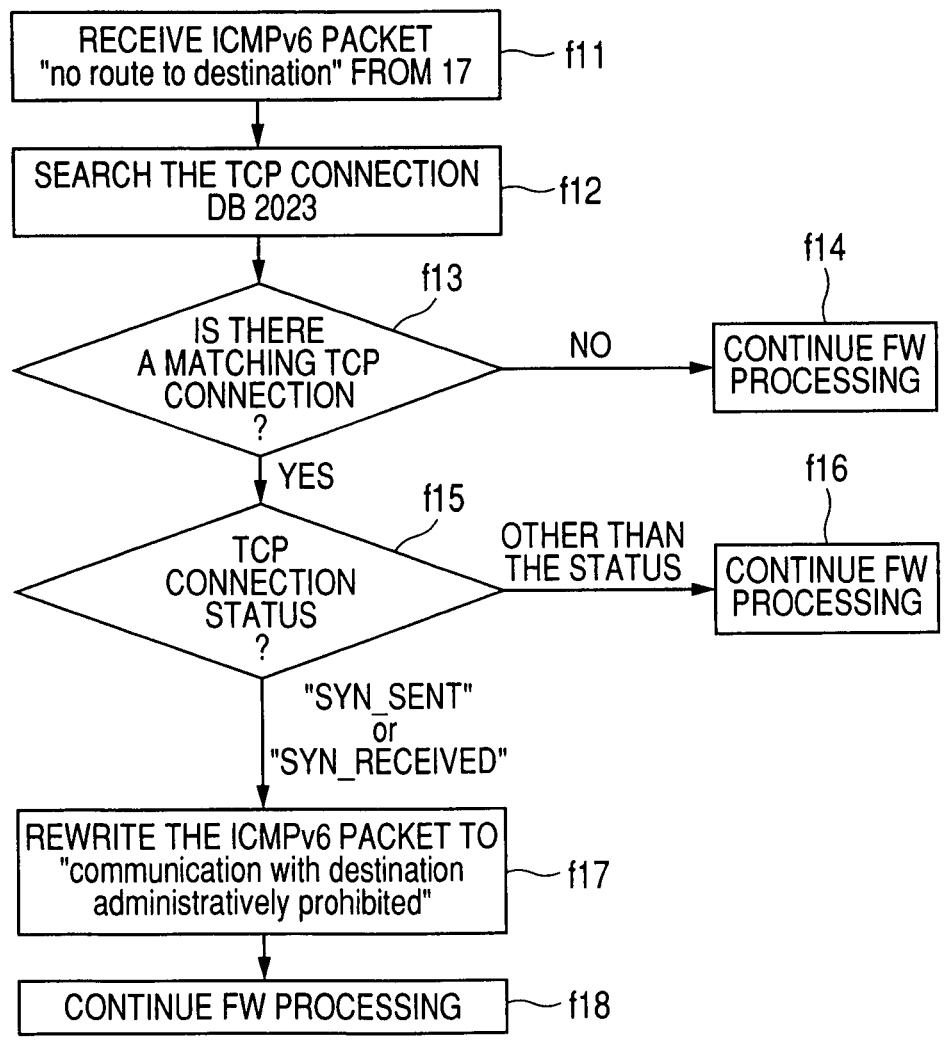
FIG. 13 is a flow chart for the software of this invention.

FIG. 13 is a flow chart for the software 16022 of this invention. This process is inserted as a pre-stage or as an intermediate stage of the normal software with FW function 16022. When the terminal 16 receives the ICMPv6 error "Destination Unreachable: no route to destination (ICMP type=1: code 0)" (f11); the software 16022 of this invention searches the TCP connection status DB 16023 (f12); and decides if there is a TCP connection matching the applicable ICMPv6 error (f13). If there is no matching TCP connection, then the firewall FW processing continues (f14). If there is a matching TCP connection, then the TCP connection status is next checked (f15). If the connection status is not "SYN_SENT" or "SYN_RECEIVED", then the firewall FW processing continues (f16). However if the connection status is "SYN_SENT" or "SYN_RECEIVED", then the received ICMPv6 packet is rewritten to a separate hard error such as the ICMPv6 error "Destination Unreachable: communication with destination administratively prohibited (ICMP type=1, code=1) (f17), and the FW processing continues (f18). This process renders the effect that the ICMPv6 error rewritten by the normal packet transfer software 16024 reaches the destination in cases where the ICMPv6 packet is not rejected by the normal FW software 16021, and the shift to an IPv4 connection can be made without waiting for a timeout.

Therefore, by just adding new software, this embodiment avoids TCP connection delays occurring due to destination unreachable by IPv6 when utilizing IPv4/IPv6 dual stacks, and without changing the main software on terminals with IPv4→IPv6 fallback functions.

Fourth Embodiment

In the first embodiment, the FW device that received the ICMPv6 soft error, promptly converted it to an ICMPv6 hard error and transmitted it to the terminal. However, there is also a need to examine the error to some extent to determine if it is indeed a "temporary fault" indicating a true soft error. The FW device in this embodiment therefore has the capability to transmit the ICMPv6 soft error unchanged a fixed number of times to the terminal, and convert the soft error to an ICMPv6 hard error at the point that the fixed transmit count is exceeded.

Figure 14:
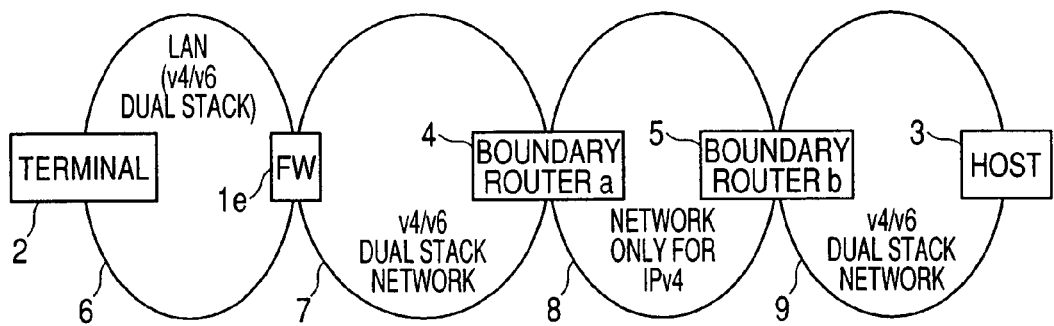
FIG. 14 is a drawing showing an example of a network not capable of making IPv6 connections between the terminal 2 and the host 3.

FIG. 14 is a drawing showing yet another example of a typical network structure for applying this invention. The FW device in the first embodiment in FIG. 2 has here been replaced with an FW device 1e for transmitting the ICMPv6 soft error unchanged, a fixed number of times to the terminal.

Figure 15:
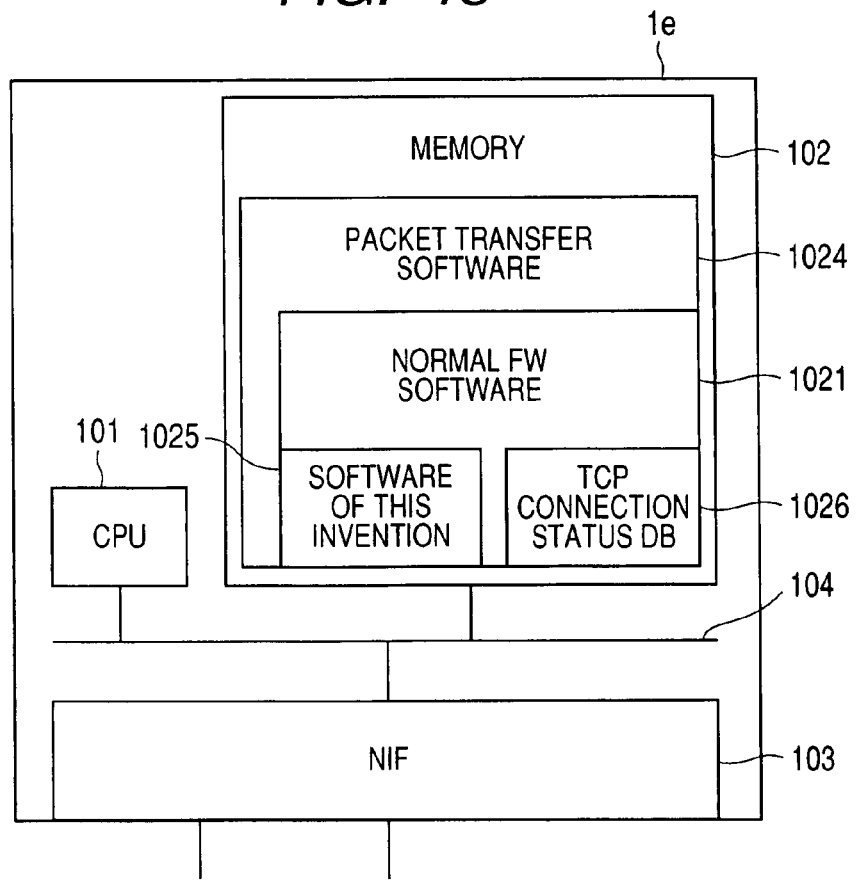
FIG. 15 is a diagram showing the FW device functioning as the server of this invention.

FIG. 15 is a device block diagram showing the FW device 1e functioning as the server of this invention. Compared to the first embodiment of FIG. 5, the software of this invention has been replaced with software 1025 possessing a function for checking the number times that soft error has been transmitted. Also, the TCP connection status database has been replaced with a TCP connection status DB 1026.

Figure 16:
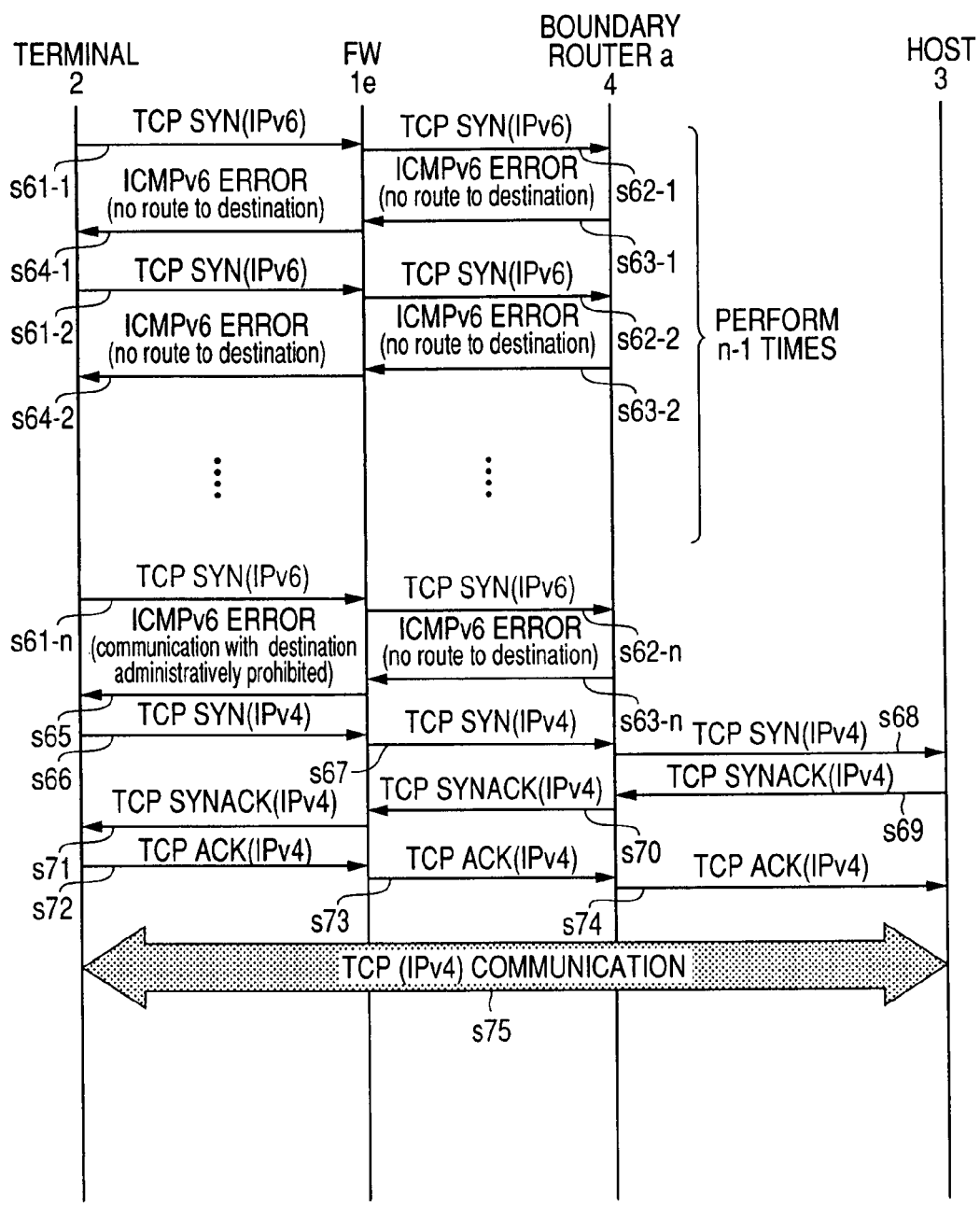
FIG. 16 is a sequence drawing of this invention where an FW is installed in the pre-stage of the terminal, in the case where an IPv6 connection is impossible between the terminal 2 and the host 3.

FIG. 16 is a sequence diagram for this invention showing the case when establishing a TCP connection from the terminal 2 to the host 3. Compared to the first embodiment in FIG. 1, here the ICMPv6 soft error is sent unchanged to the terminal, and a retry (s61-x, s62-x, s63-x, s64-x) sequence performed n−1 times (1<n<m: m is the retry count for fallback to IPv4 at the terminal), before converting the soft error to a hard error (s65).

Figure 17:
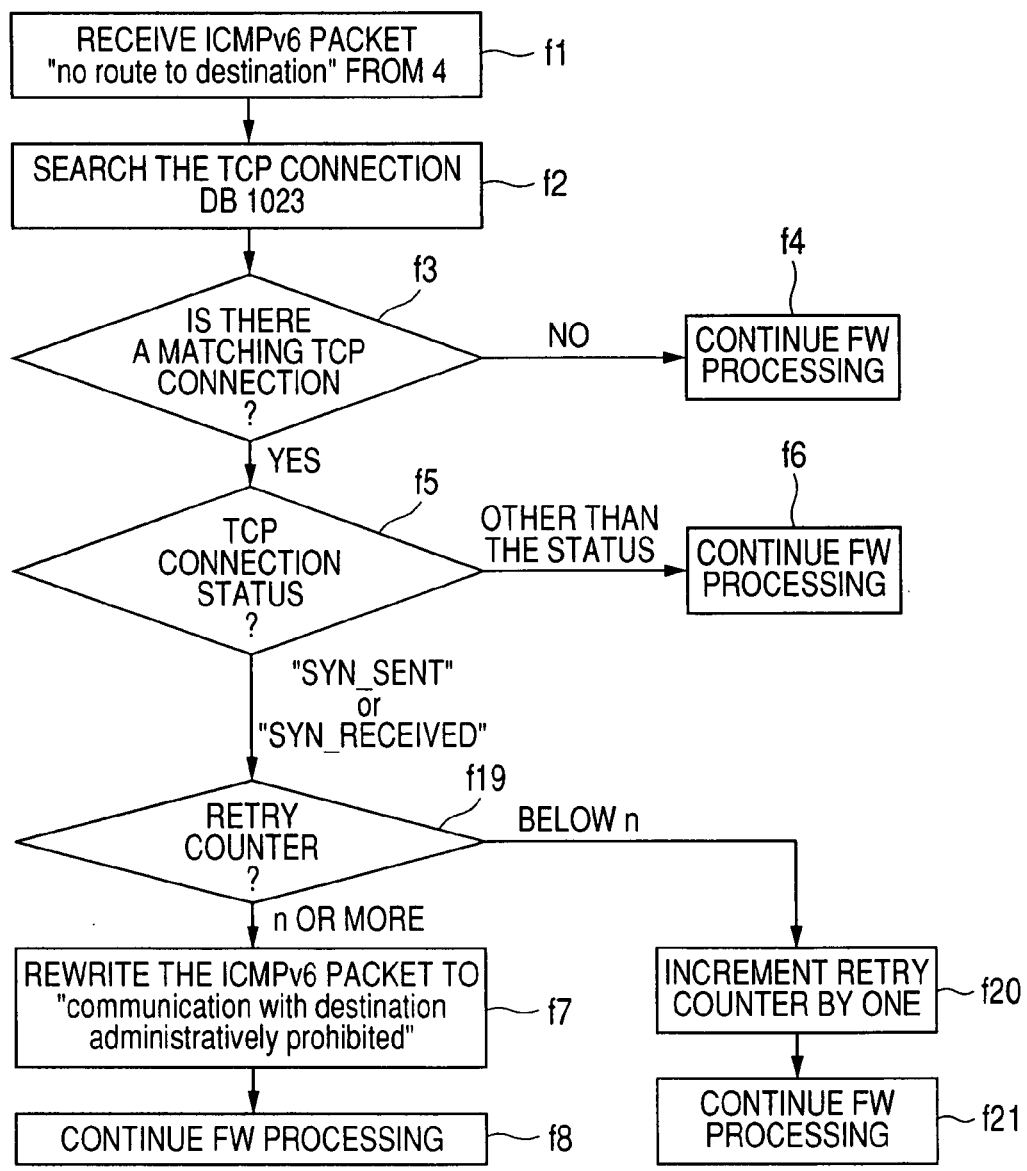
FIG. 17 is a flow chart for the software of this invention.

FIG. 17 is a flow chart for the software 1025 of this invention. Compared to the first embodiment of FIG. 6, a process f19 has been added here for checking the retry counter after first checking TCP connection status in f5. If the result from checking the counter value is below n in f19, then a 1 is added to the counter value in f20, and the FW process then continued (f21).

Figures 18, 19:
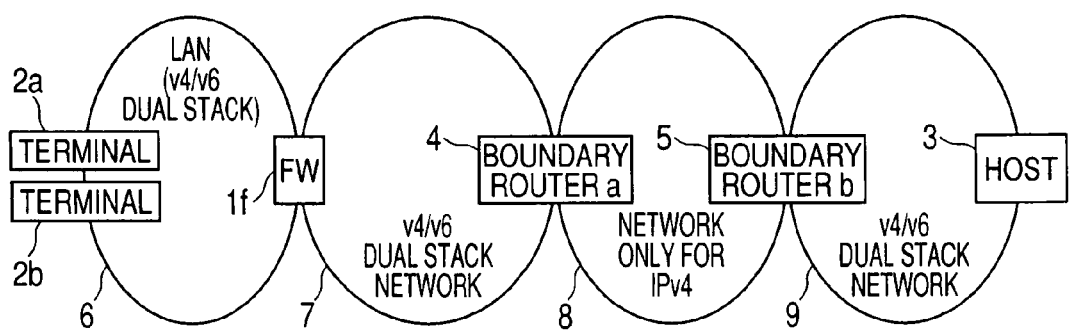
FIG. 18 is a drawing showing an example of the TCP connection status database.
FIG. 19 shows an example of a network not capable of making an IPv6 connection between the terminals 2a, 2b, and the host 3.

FIG. 18 shows an example of the TCP connection status DB 1026. Compared to the first embodiment in FIG. 7, a retry counter has been added.

This embodiment swiftly prompts the terminal to perform IPv4 fallback rather than simply entrusting IPv4 fallback to the terminal. Moreover a temporary problem on the network can be detected more accurately than in the first embodiment.

Fifth Embodiment

In the first embodiment, the ICMPv6 soft errors from all terminals were converted to ICMPv6 hard errors and transmitted. However, there may be a need to select swiftly performing fallback or to decide at each terminal if the error is a "temporary fault" indicating a true soft error. To meet that need, this embodiment of the invention contains a list of terminals in the FW device, and allows selecting whether to send the ICMPv6 error unchanged to the terminal, or to convert the soft error to an ICMPv6 hard error.

FIG. 19 is a drawing showing an example of a typical network structure for applying this invention. This embodiment differs from the first embodiment in the point that the FW device has been substituted with an FW device 1f at each terminal. Moreover, this embodiment includes a terminal 2a, that applies soft error to hard error conversion, and a terminal 2b that does not apply it.

Figure 20:
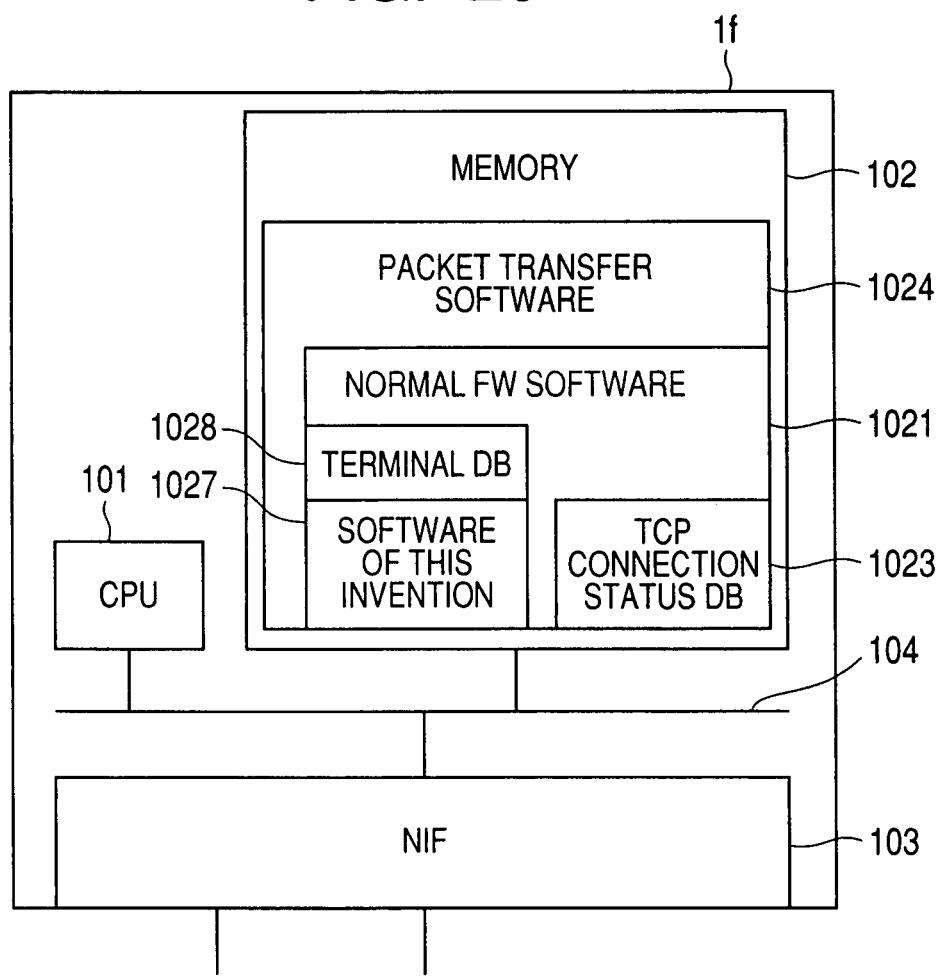
FIG. 20 is a device block diagram of the FW functioning as the server of this invention.

FIG. 20 is a block diagram of the FW device 1f functioning as the server in this invention. Compared to the first embodiment in FIG. 5, in this device, a terminal DB 1028 has been added that records the soft error to hard error conversions at each terminal. The software for this invention has also been substituted with software 1027 containing a function for checking the terminal DB 1028 applicability.

Figure 21:
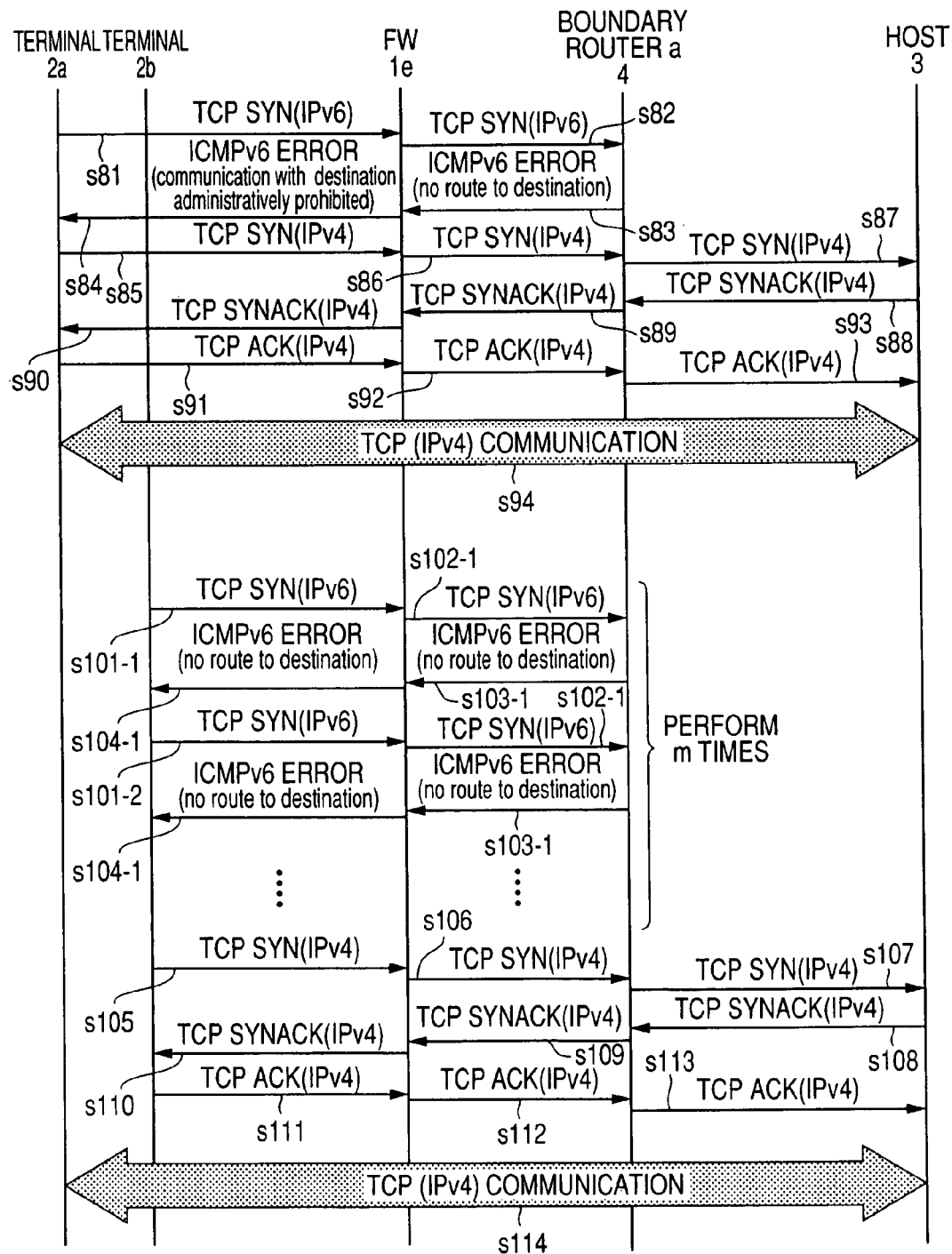
FIG. 21 is a sequence drawing of this invention where an FW is installed in the pre-stage of the terminal, in the case where an IPv6 connection is impossible between the terminals 2a, 2b and the host 3.

FIG. 21 is a sequence diagram for this invention showing the case when establishing a TCP connection from the terminal 2a, 2b to the host 3. The connection from the terminal 2a is completely the same as in FIG. 1 of the first embodiment except that the connection from terminal 2b sends the ICMPv6 soft errors unchanged to the terminal, and after a retry sequence (s101-x, s102-x, s103-x, s104-x) at m number of times (m is the number of IPv4 fallback retries at the terminal), the terminal achieves IPv4 fallback and makes the connection (s105-s114).

Figure 22:
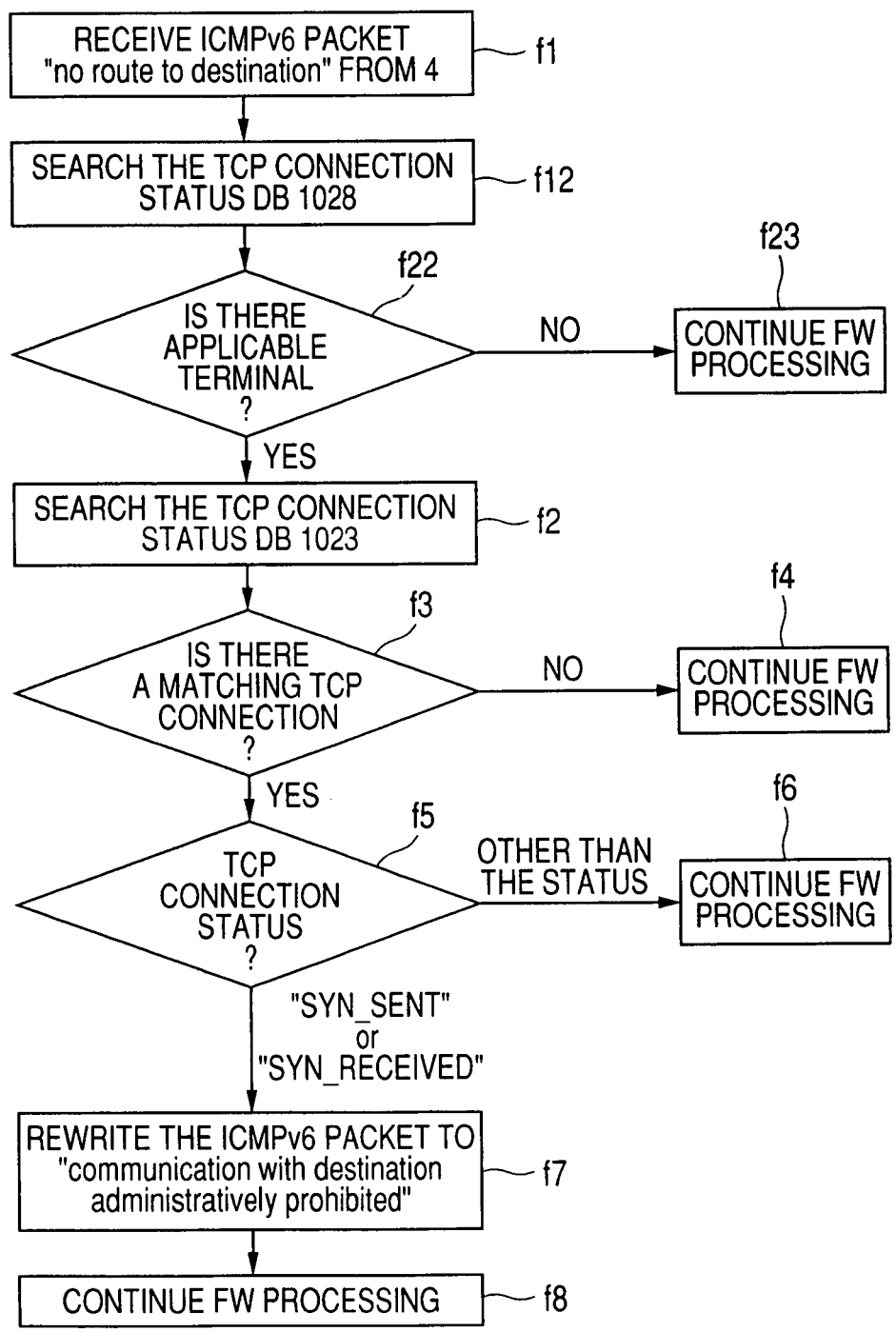
FIG. 22 is a flow chart for the software of this invention.

FIG. 22 is a flow chart for the software 1027 of this invention. Compared to the first embodiment in FIG. 6, the terminal DB 1028 is searched (f22) prior to f2 for finding the TCP connection status, and a process f23 is added for checking the terminal for making the soft error to hard error conversion. The FW process continues (f24) if the check results in f23 show that the terminal cannot be used.

FIG. 23 is a drawing showing an example of the terminal DB 1028. Here, USE or NOT USED can be selected for each terminal address.

The above embodiment allows selecting whether to let each terminal make its own IPv4 fallback, or to prompt IPv4 fallback at the terminal by soft error to hard error conversion.

What is claimed is:

1. A device connected to a source device and a destination device, the source device requesting TCP connection to the destination device, comprising:
a processor coupled to a memory and wherein the memory further comprising:
a TCP connection status database holding information of the source device, information of the destination device, and a TCP connection status between the source device and the destination device;
a function of receiving an ICMP or an ICMPv6 packet sent from the source device toward the destination device, which has a type field identifying a type of the packet and a code field identifying a content of the packet;
a function of converting a first value of the code field in the ICMP or the ICMPv6 packet whose code field indicates a soft error, to a second value of the code field indicating a hard error, with reference to the TCP connection status database, when the TCP connection status between the source device and the destination device is SYN SENT or SYN RECEIVED;
a function of sending the converted ICMP or ICMPv6 packet having the second value of the code field indicating the hard error to the source device, which is converted from the ICMP or ICMPv6 packet having the first value of the code field indicating the soft error; and
a function of recording a number of times non-converted packets are sent to the source device, wherein when the number of times exceeded to a preset number, the device converts a first value of the code field in the ICMP or the ICMPv6 packet whose code field indicates a soft error, to a second value of the code field indicating a hard error, according to the TCP connection status and sends the converted packet to the source device.

2. The device according to claim 1,
wherein the received packet is ICMPv6 packet and
wherein the device converts the ICMPv6 packet which having a value of the type field is 1 and the first value of the code field is 0 or 3, to the second value of the code field of 1 or 4 when the TCP connection status is SYN_SENT or SYN_RECEIVED.

3. The device according to claim 1,
wherein the received packet is ICMP packet and wherein the device converts the ICMP packet whose value of the type field is 3 and the first value of the code field is 0 or 1 or 5, to the second value of the code field other than 0 or 1 or 5 when the TCP connection status is SYN_SENT or SYN_RECEIVED.

4. The device according to claim 1, further including a function for holding match or non-match of the source device address with the error packet conversion function;
searching for a match when error packet addressed to the source device is received; and
when the error packet is received from the source device that matches the error packet conversion function, changing contents of that error packet that was sent toward the source device according to the TCP connection status and sending the changed contents to the source device.

5. The device according to claim 1, wherein the device converts a value of the code field of the ICMP or the ICMPv6 packet whose first vale of the code field indicates the soft error, to the second value of the code field indicating the hard error, without converting the type field.

6. The device according to claim 1,
wherein the received packet is the ICMPv6 packet and
wherein the device receives TCP SYN (IPv4) instead of TCP SYN (IPv6) after sending the converted ICMPv6 packet to the source device.

7. A packet communication method among a device and other devices comprising a source device and a destination device, connected to the device respectively, the source device requesting TCP connection to the destination device, comprising the steps of:
maintaining a TCP connection status database holding information of the source device, information of the destination device, and a TCP connection status between the source device and the destination device;
receiving an ICMP or an ICMPv6 packet sent from the source device toward the destination device which has a type field identifying a type of the packet and a code field identifying a content of the packet;
converting a first value of the code field in the ICMP or the ICMPv6 packet whose code field indicates a soft error, to a second value of the code field indicating a hard error, with reference to the TCP connection status database, when the TCP connection status between the source device and the destination device is SYN SENT or SYN received;
sending the converted ICMP or ICMPv6 packet having the second value of the code field indicating the hard error to the source device, which is converted from the ICMP or ICMPv6 packet having the first value of the code field indicating the soft error; and
recording a number of times non-converted packets are sent to the source device, wherein when the number of times exceeded to a preset number, the device converts a first value of the code field in the ICMP or the ICMPv6 packet whose code field indicates a soft error, to a second value of the code field indicating a hard error, according to the TCP connection status and sends the converted packet to the source device.

8. The packet communication method according to claim 7, wherein the received packet is ICMPv6 packet and wherein in the step of converting, the device converts the ICMPv6 packet whose value of the type field is 1 and the first value of the code field is 0 or 3, to the second value of the code field of 1 or 4 when the TCP connection status is SYN_SENT or SYN_RECEIVED.

9. The packet communication method according to claim 7, wherein the received packet is ICMP packet and wherein in the step of converting, the device converts the ICMP packet whose value of the type field is 3 and the first value of the code filed is 0 or 1 or 5, to the second value of the code field other than 0 or 1 or 5 when the TCP connection status is SYN_SENT or SYN_RECEIVED.

10. The packet communication method according to claim 7, wherein in the step of converting, the device converts a value of the code field of the ICMP or the ICMPv6 packet whose first vale of the code field indicates the soft error, to the second value of the code field indicating the hard error, without converting the type field.

11. The packet communication method according to claim 7, wherein the received packet is the ICMPv6 packet and wherein the device receives TCP SYN (IPv4) instead of TCP SYN (IPv6) after sending the converted ICMPv6 packet to the source device.

* * * * *